Dec. 22, 1953 F. MÜLLER 2,663,561
APPARATUS FOR HEATING FINE-GRAINED
MATERIAL, PARTICULARLY
CEMENT RAW MATERIAL
Filed Dec. 7, 1951 2 Sheets-Sheet 2

INVENTOR
Franz Müller
BY Knight Brothers
Attorneys

Patented Dec. 22, 1953

2,663,561

UNITED STATES PATENT OFFICE 2,663,561

APPARATUS FOR HEATING FINE-GRAINED MATERIAL, PARTICULARLY CEMENT RAW MATERIAL

Franz Müller, Bensberg-Refrath, Germany, assignor to Klöckner-Humboldt-Deutz A. G., Koln (Rhine), Germany, a German corporation Application December 7, 1951, Serial No. 260,553

Claims priority, application Germany December 13, 1950

4 Claims. (Cl. 263—30)

This invention relates to means for the heat processing of pulverulent or other fine-granular material and, in one of its particular aspects, to the heating of cement raw material by exit gases from a rotary kiln to which the material is being supplied.

One of the known apparatus for the heating of cement raw material by kiln exit gases comprises a number of serially interconnected cyclone-type heat exchangers designed and operative in the manner of rotary-gas-flow dust separators. The kiln gases are forced through these separators (cyclones) by a blower and the material to be heated is passed through the cyclones in counterflow to the gases, the dust discharge pipe of each cyclone, with the exception of the one adjacent to the kiln, being joined with the gas outlet conduit of the preceding cyclone of the series.

In the known apparatus, the gas conduits between the interconnected cyclones are rather long and have several bends so that a high flow resistance is encountered and excessive deposits of dust may collect in the bends.

It is an object of the invention to obviate or greatly reduce these shortcomings and difficulties. Another more specific object of the invention is to reduce the spacing between the interconnected cyclones and hence the over-all space requirements of the entire apparatus, without detriment to the desired heat exchanging operation.

According to a feature of the invention, the interconnected cyclones of the group are arranged in two vertical rows staggered relative to each other so that each cyclone pertains to a row different from that of the cyclone next following along the path of the hot gases. The gas outlet conduit of each cyclone extends at first vertically upward and then about horizontally to the next following cyclone. Consequently, only short gas conduits, each with only one bend, are required so that the entire cyclone arrangement becomes greatly condensed in space while affording a satisfactory heat exchange. A further improvement in heat exchange is achieved if, according to another feature of the invention, the gas conduit from each lower cyclone extends upwardly as closely as possible to below the next higher cyclone of the same row and the dust discharge pipe of the latter cyclone is axially inserted into the vertical portion of the gas conduit. In this case the dust discharge pipe is surrounded virtually over its entire length by the hot flow of gases so that the material is already subjected to heating while passing through the discharge pipe.

The foregoing and other objects, advantages and features of the invention will be apparent from the following description in conjunction with the embodiment of the invention illustrated on the drawings in which:

Fig. 4 shows a schematical cross section of another portion of the same apparatus serving for the elimination of foreign bodies from the dust discharge of the cyclones.

Figure 1:
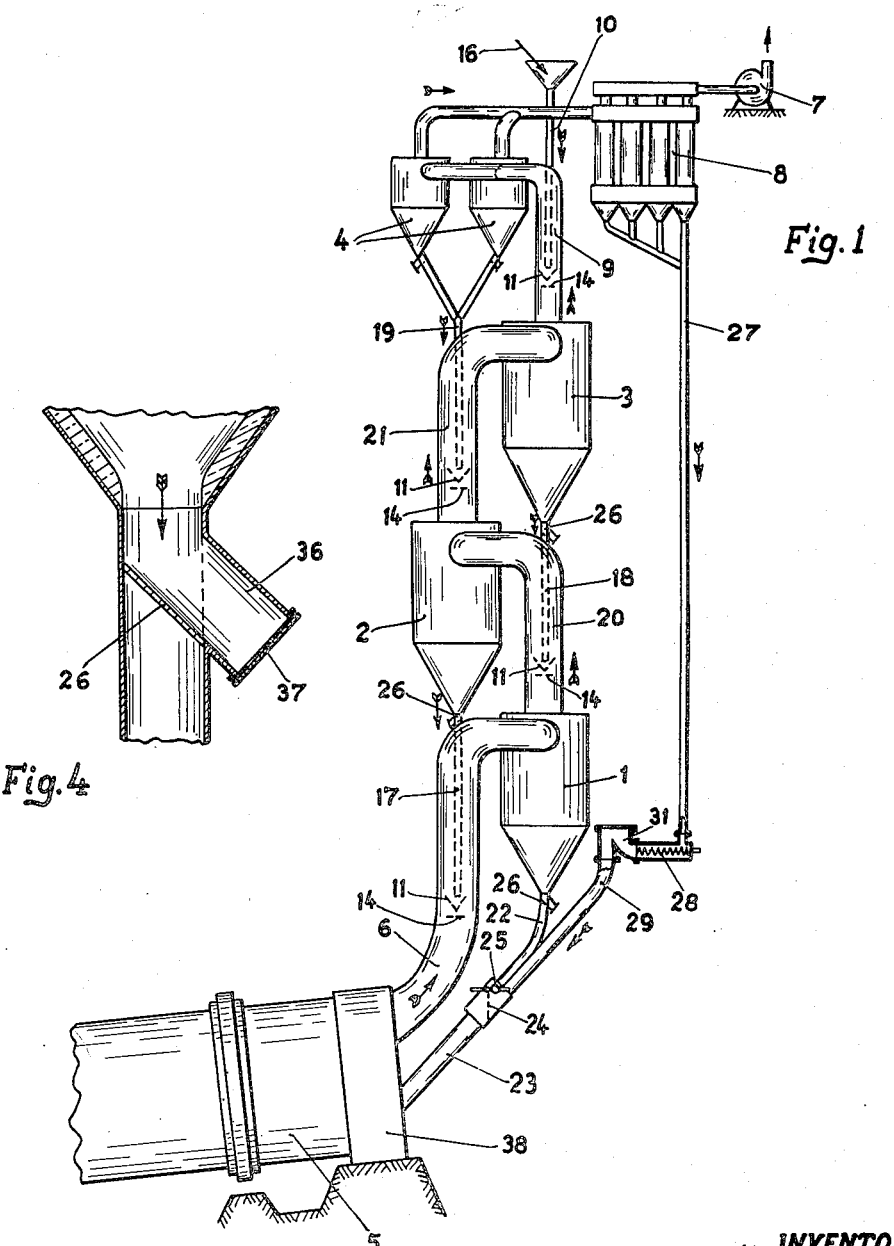
Fig. 1 shows schematically an apparatus for the heat processing of cement raw material by hot exit gases of a rotary kiln.

As apparent from Fig. 1, the illustrated heating apparatus comprises a group of heat exchangers 1, 2, 3 and 4 connected to a rotary kiln 5. Each exchanger consists of a rotary-gas-flow separator (cyclone) to which the gas is supplied tangentially and, hence, is caused to rotate before leaving the vessel through the gas outlet conduit. For better dust separation, the cyclone 4 is composed of two parallel-connected individual cyclone units each smaller cross section and volume than any of the other cyclones.

The cyclone 1 is connected through a gas conduit 6 with the stationary hood 36 of the kiln. The hot exit gases from the kiln pass through this conduit into the cyclone 1 and thence successively through the cyclones 2, 3, and 4. The gases are exhausted by a blower 7 through a dust separating device 8 disposed at the end of the gas flow path. The device 8 comprises several cyclone units of correspondingly smaller diameters.

The cement raw material is supplied through a hopper 16 whence it passes through a supply pipe 10 into the gas conduit 9 leading from cyclone 3 to cyclone 4. The supply pipe 10 extends axially within the gas conduit 9 along an appreciable portion of this conduit so that the discharge end of the supply pipe is close to the top of the cyclone 3.

Figure 2:
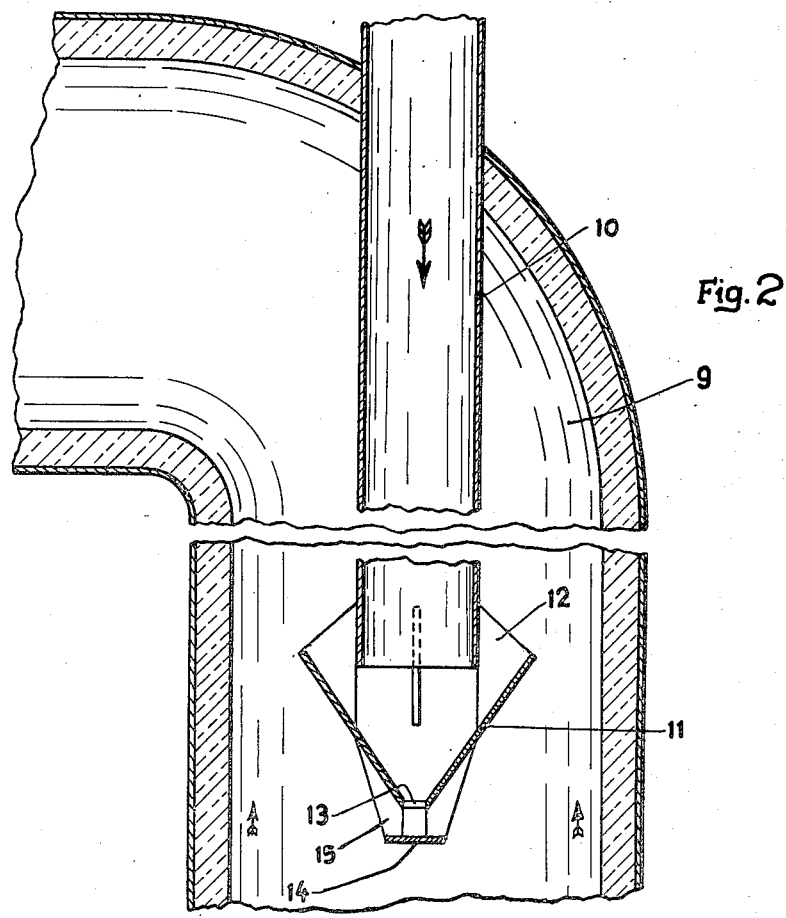
Fig. 2 shows on a larger scale a cross sectional view of one of the portions of the same apparatus at which dust from one of the pertaining cyclones is discharged into the gas outlet conduit of another cyclone.

As best apparent from Fig. 2, an upwardly flaring funnel structure 11 is mounted below the opening of the supply pipe 10. The funnel 11 is attached to pipe 10 by means of connecting webs 12. Its upper rim is preferably slightly higher than the discharge opening of pipe 10. The funnel 12 has an opening 13 at its bottom, and a disc 14 is disposed below this opening in spaced relation thereto. Disc 14 is fastened to the funnel structure 12 by connecting webs 15.

The raw material drops through pipe 10 into the funnel 12 and, during the operation of the apparatus, keeps the funnel space filled because the opening 13 is relatively small. Consequently, the material flows mainly over the circular upper edge of the funnel. At the same time, a smaller portion of the supply passes through the opening 13 and flows over the circular rim of disc 14 thus entering the ascending gas current in a uniform distribution. The distance of the disc 14 from the bottom opening 13 of the funnel is sufficiently large to prevent clogging of the material at this point. The filled funnel space forms a gas trap and hence prevents the ascending gas from entering into the supply pipe 10.

The dust material separated within the cyclones 2, 3 and 4 is introduced, in the same manner as just explained with reference to Fig. 2, from the dust discharge pipes 17, 18 and 19 into the respective gas conduits 6, 20 and 21. The dust separated within the cyclone 1 drains through pipes 22 and 23 into the rotary kiln. A pendulous flap 24 is interposed between pipes 22 and 23. Flap 24 may be adjusted by levers and a weight 25 so that it has a slight closing moment which is overpowered by the dropping dust. The pendulous flap 24 prevents the entrance of kiln gases into the discharge pipe 22.

The cyclones 1, 2 and 3 as well as the gas conduits 6, 20, 21 and 9 are provided with heat insulating linings, for instance, of heat-insulating masonry. This, in conjunction with the spacially contracted arrangement of the cyclones and their very short gas conduits, has the advantage that the heat losses of the kiln-exit gases are reduced to a minimum.

Since the temperature in the units of the cyclone 4 are considerably lower, this cyclone need be provided only with an exterior heat insulation. The individual cyclone units of the dust separating device 8 at the end of the gas flow path are preferably not heat insulated at all so that the gases leaving the apparatus are more rapidly cooled and contract to a correspondingly smaller volume, thus reducing the power requirements for the draft blower.

The path of travel of the dust material from hopper 16 to the kiln 5 may be traced as follows. The material, passing from hopper 16 through supply pipe 10 into the gas outlet conduit 9 of cyclone 3, is entrained by the upward flow of hot gases and is thus conveyed in suspension to the next higher cyclone 4. In cyclone 4, the dust separated from the gases passes through dust discharge pipe 19 into the gas outlet conduit 21 of cyclone 2. The upward flow of hot gases in conduit 21 carries the dust into cyclone 3 where the dust is again separated from the gases to drain through discharge pipe 18 into the upstream of gases within gas outlet conduit 20 of cyclone 1 to be conveyed upwardly into cyclone 2. The dust separated from the gases in cyclone 2 then drains through discharge pipe 17 into the gas conduit 6 and is again entrained by the upward flow of gases, thus reaching the lowermost cyclone 1 from which the separated dust is admitted to the kiln as described.

It will be recognized that the travelling path of the dust material, though generally downward in opposition to the upward flow of hot kiln gases, follows a zig-zag course which meanders between the two vertical separator columns, and that the material is alternately conveyed downwardly by gravity and upwardly by suspension within the forced flow of hot gases.

A screening device for eliminating foreign inclusions is preferably provided at the lower end of each cyclone. According to Fig. 4, the screening device comprises a slanted screen 26 across the pertaining dust discharge pipe. Adjacent to the screen 26 is a branch stub 36 covered by a lid 37. Larger pieces of material that may be included in the dust discharge, for instance, pieces of insulating masonry broken off the cyclone walls, are retained on the screen 26 and can be removed by opening the lid 37.

The material separated from the gas flow in the final dust separating device 8 passes through a pipe 27 into a pressure lock 28 from which it reaches the kiln through a connecting pipe 29 joined with the above-mentioned pipe 23. The pressure lock 28, separately shown in Fig. 3 has a conveyor or feed screw 30 which passes the material from the discharge pipe 27 into a trap chamber 31. Chamber 31 is bordered by a curved wall portion 32 of a box 33 closed by a removable cover 34. The material conveyed by the screw 30 is trapped at the curved wall 32 and continuously overflows from the trap into the connecting pipe 29. The trap thus forms a gas seal between pipes 29 and 27 which prevents an equalization of the pressure difference existing between them. The trap seal also protects the mechanical parts of the screw 30 from the high temperature obtaining in the lower part of the pipe conduit.

Figure 3:
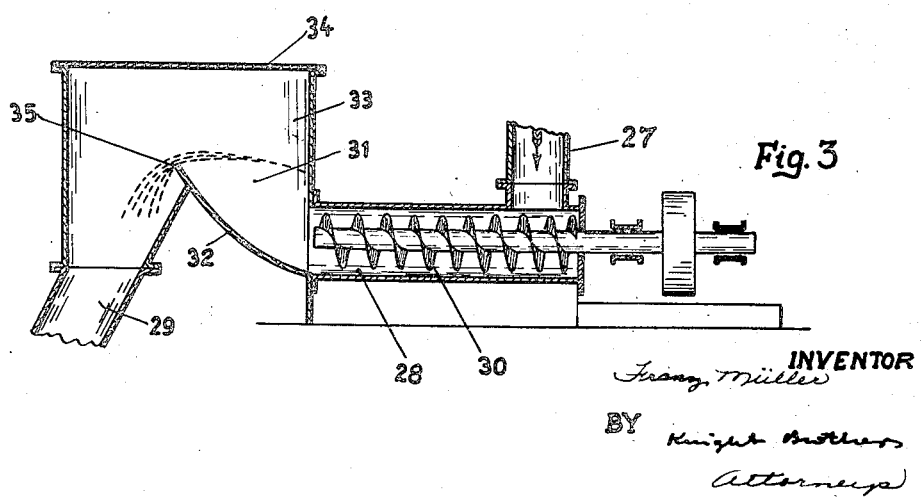
Fig. 3 shows schematically and in section a conveyor and trap device also pertaining to the apparatus of Fig. 1.

A lock device according to Fig. 3 is also advantageous in other cases or for more general purposes where pourable material is to be introduced through a pipe or into a container filled with hot gases.

The opening 13 at the lower end of the funnel structure 11 serves the purpose of permitting a continuous escape of a small amount of dust so that the entire contents of the funnel space is kept in motion and is completely drained when the apparatus is set out of operation. This eliminates the danger of hot or sticky material baking or otherwise adhering to the funnel.

Preferably the depth to which the dust discharge pipes, such as pipe 10 (Fig. 2) enter into the trap space of the funnel structure 11 is made adjustable. The most favorable depth depends upon the pouring weight of the raw material as well as upon the pressure difference obtaining at this point between the interior of the pipe 10 and the interior of the gas conduit 9. The same applies also to the discharge ends of pipes 17, 18 and 19. That is, the entrance depth of these pipes into the corresponding funnel structures is preferably also made adjustable.

The process and the illustrated apparatus described above involve features not claimed herein which are also disclosed and are claimed in the patent application of Franz Müller and Leonhard H. Winners, entitled Heat Processing of Fine-Grained Material Particularly Cement Raw Material and filed concurrently herewith.

It will be obvious to those skilled in the art upon a study of this disclosure that the invention permits of variations, modifications other than those specifically described, without departing from the essence of the invention and within the scope of the claims annexed hereto.

I claim:

1. Apparatus for heating dust material such as cement raw material by hot gases, comprising two horizontally spaced banks of dust-from-gas separators each having a plurality of separators disposed above one another and vertically displaced from the separators of the other bank; each separator having a dust discharge pipe extending downwardly from the bottom of the separator, a lateral gas inlet, and a gas outlet conduit extending upward from the top of the separator; said gas outlet conduit of each separator in each bank being joined with said gas inlet of the next higher separator of the other bank with the exception of the gas outlet conduit of the uppermost separator so that hot gas may pass from the gas inlet of the lowermost separator sequentially through all separators; a dust supply pipe entering from above into the gas outlet conduit of the second highest separator, and said dust discharge pipe of each separator, with the exception of the lowermost separator, extending in each bank from the separator downwardly into the gas outlet conduit of the next lower separator of the same bank, whereby dust is gravity fed from each separator through each of said pipes into the outlet conduit and is gas-flow conveyed from said conduits through the gas inlets of the next higher separators respectively.

2. Apparatus for heating dust material such as cement raw material by hot gases, comprising at least two separators spaced vertically and horizontally from each other; each separator having a lateral gas inlet, a gas outlet on the top of the separator, and a dust discharge pipe extending downward from the bottom of the separators; an upper gas conduit and a lower gas conduit each having a substantially vertical portion and having a lateral portion extending laterally away from the top of said vertical portion to one of said respective inlets, said vertical portion of said upper conduit extending upward from said gas outlet of the lower separator for passing an upward flow of hot gas from said lower conduit sequentially through said separators; a dust supply pipe extending from above into said vertical portion of said upper conduit, said dust discharge pipe of said upper separator being aligned with said vertical portion of said lower conduit and extending from above into said latter vertical portion, whereby dust is gravity fed through each of said pipes and is gas-flow conveyed from said conduits to said respective inlets.

3. In combination, a rotary kiln for processing cement raw material, a series of cyclone-type separators arranged above one another, each separator having a lateral inlet, a gas outlet on the top of the separator, and a bottom pipe for the discharge of dust; a gas conduit extending upwardly from the gas outlet of each lower separator to the inlet of the next higher separator, the lowermost separator of said series having its gas inlet and its dust discharge pipe connected with said kiln to receive gas from said kiln and supply heated raw material to said kiln respectively; blower means joined with said series to force gas from said kiln upwardly through said series; each of said remaining dust discharge pipes extending over its entire length downwardly into the gas conduit leading to the inlet of the next lower separator and having a downwardly directed dust discharge opening within said latter gas conduit; material supply means having a supply pipe extending into the gas conduit leading to the inlet of the uppermost separator of said series.

4. With a rotary kiln for processing dust material such as cement raw material, in combination a plurality of dust-from-gas separators series-connected with each other above the kiln and forming together a single continuous gas-flow path, one of said separators having a separator vessel and having a lateral gas inlet opening said vessel, a gas outlet conduit extending up from the top of said vessel to another one of said separators, and a dust discharge pipe extending over its entire length downwardly from the bottom of said vessel to said kiln; a gas inlet conduit having an upper portion extending laterally from said inlet opening of said vessel and a lower portion extending from said upper portion down to said kiln to receive hot gases from said kiln; a dust inlet pipe extending from above into said lower portion of said gas inlet conduit and having a downwardly directed discharge opening within said lower portion, whereby dust is gravity fed through said dust inlet pipe into said gas inlet conduit and is gas-flow conveyed upwardly in said gas inlet conduit and into said vessel, and said separators and said discharge pipe and said dust inlet pipe forming together a single continuous path for dust extending from said dust inlet pipe into said kiln.

FRANZ MÜLLER.

References Cited in the file of this patent
UNITED STATES PATENTS

| Number | Name | Date |
|---|---|---|
| 241,108 | Wiesenbrock | May 3, 1881 |
| 729,009 | Sutton et al. | May 26, 1903 |
| 2,014,764 | Gram | Sept. 17, 1935 |
| 2,077,346 | Voskamp | Apr. 13, 1937 |
| 2,290,068 | Petersen | July 14, 1942 |
| 2,409,707 | Roetheli | Oct. 22, 1946 |
| 2,559,876 | Hoekstra | July 10, 1951 |
| 2,574,850 | Utterback | Nov. 13, 1951 |
| 2,648,532 | Muller et al. | Aug. 11, 1953 |